United States Patent [19]

Weirich et al.

[11] 4,378,027
[45] Mar. 29, 1983

[54] CONTROL UNIT FOR AN ELECTRO-HYDRAULIC ROOF SUPPORT CONTROL ARRANGEMENT

[75] Inventors: Walter Weirich, Dortmund; Harry Rosenberg, Ludinghausen, both of Fed. Rep. of Germany

[73] Assignee: Gewerkschaft Eisenhutte Westfalia, Lunen, Fed. Rep. of Germany

[21] Appl. No.: 249,316

[22] Filed: Mar. 31, 1981

[30] Foreign Application Priority Data

Apr. 2, 1980 [DE] Fed. Rep. of Germany ....... 3012883

[51] Int. Cl.³ .......................................... F15B 13/06
[52] U.S. Cl. .............................. 137/596.16; 137/551; 137/596.17; 137/884; 137/885; 174/52 R; 405/302
[58] Field of Search ............. 137/551, 596.16, 596.17, 137/884, 885; 174/50, 52 R, 65 R; 405/302

[56] References Cited

U.S. PATENT DOCUMENTS

| | | | |
|---|---|---|---|
| 3,215,158 | 11/1965 | Bass et al. | 137/596.16 X |
| 3,353,068 | 11/1967 | Turk | 174/52 R X |
| 3,504,704 | 4/1970 | Beckett et al. | 137/625.64 |
| 3,513,876 | 5/1970 | Tarbox | 137/884 X |
| 3,654,960 | 4/1972 | Kiernan | 137/884 |
| 3,821,880 | 7/1974 | Weirich et al. | 405/302 |
| 4,100,937 | 7/1978 | Mallory | 137/596.16 |

*Primary Examiner*—Gerald A. Michalsky
*Attorney, Agent, or Firm*—Sughrue, Mion, Zinn, Macpeak and Seas

[57] ABSTRACT

A control unit/hydraulic control mechanism for controlling the hydraulic working appliances of a mine roof support unit has a control unit mounted on one side of a distributor plate, and a valve block mounted on the other side of the distributor plate. The distributor plate and the valve block constitute the hydraulic control mechanism, the valve block being constituted by a stack of pilot-operated hydraulic control valves. The control unit has a protective casing defining first and second chambers. The first chamber accomodates a plurality of electromagnetic valves. The second chamber constitutes a lead-through chamber for leading electric cables to the electromagnetic valves. The second chamber is provided with a respective socket for each of the electric cables. Each of the sockets is shaped to mate with a complementary member attached to the associated electric cable, whereby the electric cables can be connected to the control unit so as to resist tensile forces, and in such a manner that the interior of the second chamber is sealed with respect to the external atmosphere.

19 Claims, 5 Drawing Figures

CONTROL UNIT FOR AN ELECTRO-HYDRAULIC ROOF SUPPORT CONTROL ARRANGEMENT

BACKGROUND TO THE INVENTION

This invention relates to a control unit for an electro-hydraulic roof support control arrangement, and to a control unit/hydraulic control mechanism for such a control arrangement.

A known type of control unit/hydraulic control mechanism of this type has a plurality of hydraulic control valves mounted on a distributor plate, the control valves and the distributor plate constituting the hydraulic control mechanism. The control unit contains electromagnetic valves which are used to actuate the control valves, which in turn control the operations of the various hydraulic working appliances of, for example, a mine roof support unit. Known hydraulic and electro-hydraulic roof support control arrangements can be controlled, via electric cables, from a central control stand disposed in the gallery or at the end of the face. Each roof support unit is provided with a control unit/hydraulic control mechanism which enables the hydraulic working appliances of that roof support unit to be controlled in various ways. For example, the hydraulic working appliances can be controlled automatically and sequentially from the central control stand, optionally from either the right-hand or left-hand adjacent roof support unit, or individually by manual or automatic control.

By providing each of the control units with a programmable electric control box, it is possible to effect continuous monitoring of the equipment at the face from the central control stand. In other words, all the roof support units at the face can be supervised from the central control stand, and all the control units can be electrically actuated so that the associated hydraulic control valves carry out a predetermined programme. In this system, the control units can be such that the required work operations, that is to say the programmes stored in the electronic control boxes, can be initiated not only from the central control stand, but also at the individual control units. Usually, this is achieved by manual operation of the individual control units, but this is only possible provided a "release signal" has previously been sent from the central control stand. In such a system, each of the electronic control boxes may also include a selector switch for designating the desired form of control, for example, automatic sequential control, control from the left or the right, individual manual control, or individual automatic control.

The aim of the invention is to provide a control unit and a control unit/hydraulic control mechanism, which can be made from a plurality of individual sub-units, which is compact, easy to assemble, and readily adaptable to suit different control functions.

SUMMARY OF THE INVENTION

The present invention provides a control unit for an electro-hydraulic roof support control arrangement, the control unit having a protective casing defining first and second chambers, the first chamber accommodating a plurality of electromagnetic valves, and the second chamber constituting a lead-through chamber for leading electric cables to the electromagnetic valves, the second chamber being provided with a repective aperture for each of the electric cables, each of the apertures being adapted for connection to a complementary member attached to the associated electric cable, whereby the electric cables are connectible to the control unit so as to resist tensile forces, and in such a manner that the interior of the second chamber is sealed with respect to the external atmosphere.

Advantageously, the second chamber is smaller than the first chamber.

The electromagnetic valves of this control unit are protectively accommodated within a separate chamber (the first chamber) of the protective casing, whereas the second, smaller chamber serves to connect the electric cables and to lead them through to the electromagnetic valves. The second chamber is sealed off against the external atmosphere, and so forms a dry compartment between the first chamber and the outside of the control unit.

Preferably, the protective casing has a third chamber for accommodating an electronic control box. Each of the chambers may be cuboidal, and the control unit may further comprise an electronic control box located within the third chamber, the electronic control box being insertable into, and removable from, the third chamber as a unit. Alternatively, the electronic control box could be mounted on the outside of the protective casing. In either case, the electronic control box can be programmed so that a desired work programme can be selected by manual actuation.

In use, the control unit is attached to a distributor plate, a valve block also being attached to the distributor plate. The distributor plate and valve block constitute a hydraulic control mechanism for controlling the hydraulic working appliances of, for example, a mine roof support unit. The control unit can, therefore, form part of a compact modular unit which also includes the hydraulic control mechanism. Since the electromagnetic valves can be encased so as to keep out dust and moisture, the first chamber need not be sealed off in an absolutely tight manner. Depending upon the required programmes needed for different operation requirements, the number of electromagnetic valves in the first chamber can be varied. Moreover, where it is required to extend an existing programme, it is possible to add further electromagnetic valves.

Advantageously, the third chamber is open at one side of the protective casing, and the electronic control box is such that one surface thereof is substantially co-planar with the open side of the third chamber when the electronic control box is fully inserted into the third chamber. Preferably, the electronic control box and the third chamber are provided with co-operable guide means, whereby the electronic control box can be introduced into, and removed from, the third chamber in the manner of a drawer. Conveniently, the third chamber extends over the entire width of the protective casing, the first and second chambers being located to the rear of the third chamber and being separated therefrom by a partition which extends the entire depth of the third chamber. The partition may be provided with apertures for the passage of electric leads from the electronic control box to the electromagnetic valves. Each of the apertures in the partition may be a generally cylindrical socket.

Preferably, each of the apertures in the second chamber is constituted by a generally cylindrical socket, the generally cylindrical sockets being adapted to mate with plug pins attached to the protective sleeves which accomodate the electric cables which pass through the second chamber. The connection between each electric cable and its socket may be made resistant to tensile forces by the provision of respective U-shaped bifurcated plugs.

The invention also provides a control unit hydraulic control mechanism comprising a control unit as defined above, a distributor plate, and a valve block, the protective casing of the control unit being mounted on one side of the distributor plate, and the valve block being mounted on the other side of the distributor plate.

Advantageously, the protective casing of the control unit is detachably connected to the distributor plate by means of screw-threaded members.

Preferably, the valve block is constituted by a plurality of piston-operated 4/3 way hydraulic control valves.

Conveniently, one side of the first chamber is closed off by said one side of the distributor plate; and the opposite side of the first chamber is closed off by a cover plate which is detachably connected to the protective casing of the control unit. Similarly, one side of the second chamber is closed off by said one side of the distributor plate; and the opposite side of the second chamber is closed off by said cover plate.

BRIEF DESCRIPTION OF THE DRAWINGS

A control unit, for an electro-hydraulic roof support control arrangement, constructed in accordance with the invention will now be described, by way of example, with reference to the accompanying drawings, in which.

DESCRIPTION OF PREFERRED EMBODIMENTS

Figure 1:
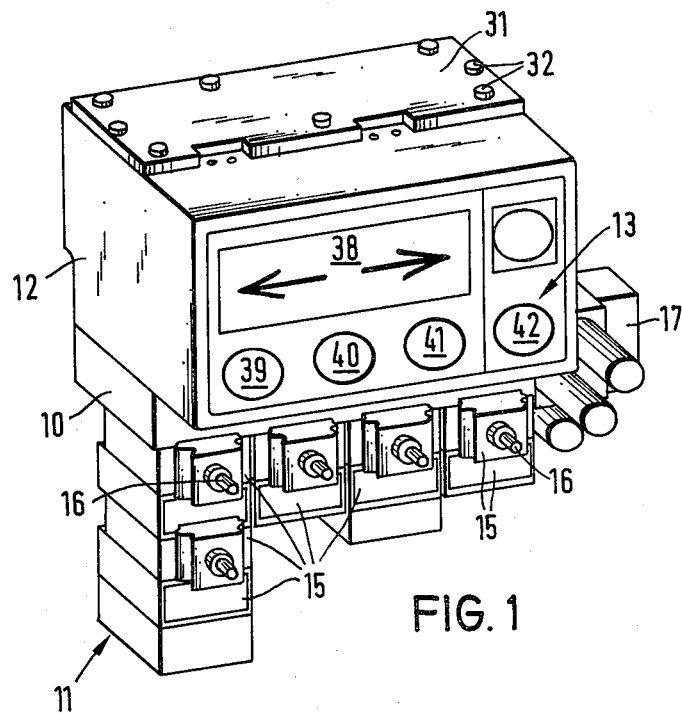
FIG. 1 is a perspective view of the control unit and part of an associated hydraulic control mechanism.
Figure 2:
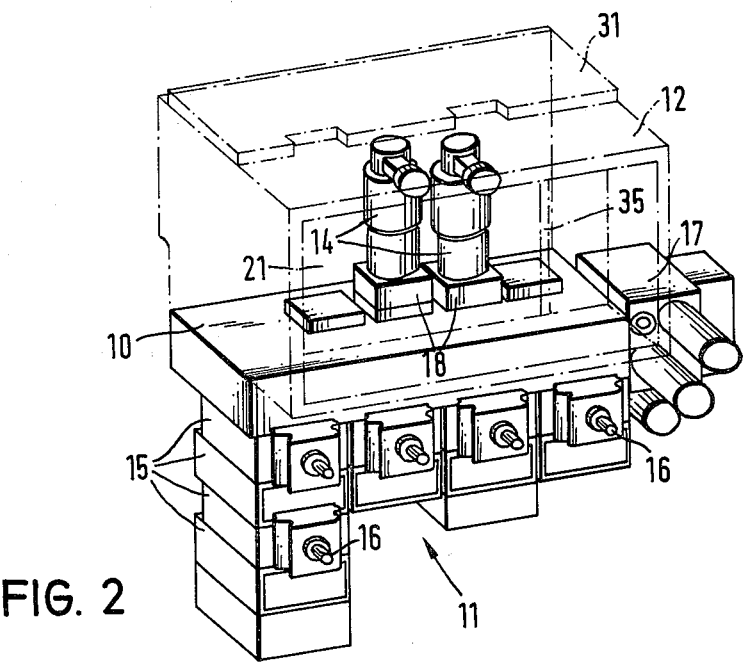
FIG. 2 is a perspective view similar to that of FIG. 1, but shows the protective casing of the unit in dash-dot lines.
Figure 3:
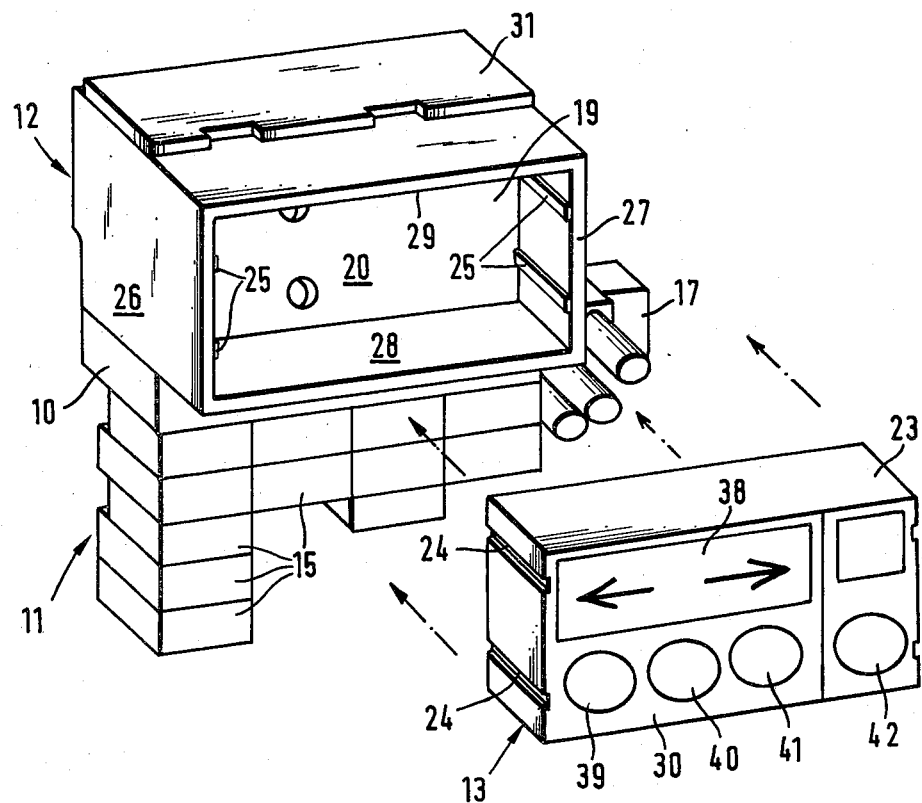
FIG. 3 is an exploded perspective view of the control unit and said associated hydraulic control mechanism part.

Referring to the drawings, FIGS. 1 to 3 show a control unit and a hydraulic control mechanism for controlling the hydraulic working appliances (such as the props and the advance and alignment rams) of one roof support unit (not shown) of a mine roof support assembly. The mine roof support assembly is constituted by a plurality of roof support units positioned side-by-side along the goaf side of a longwall conveyor, and each of the roof support units has a control unit/hydraulic control mechanism similar to that illustrated in the drawings. The illustrated control unit/hydraulic control mechanism is either fitted directly to the roof support unit being controlled, or positioned adjacent thereto (for example on the conveyor).

Figure 5:
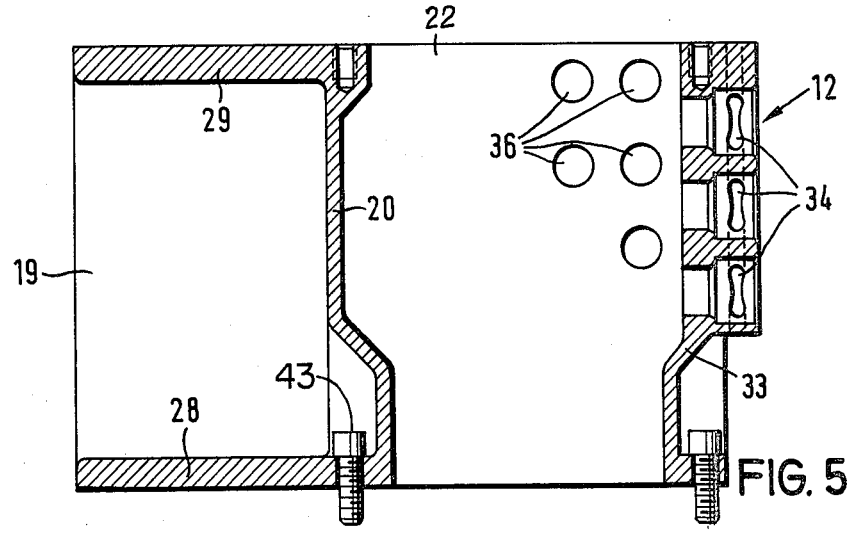
FIG. 5 is a cross-section taken on the line V—V of FIG. 4.

The hydraulic control mechanism comprises a valve block 11 mounted on the lower face of a distributor plate (manifold) 10; and the control unit comprises a protective casing 12 which houses a plurality of electromagnetic valves 14 (only two of which are illustrated—see FIG. 2) and an electronic control box 13. The protective casing 12 is attached to the upper face of the distributor plate 10 by means of screw-threaded members 43 (FIG. 5).

The valve block 11 comprises, in known manner, a stack of pilot-operated 4/3 way hydraulic control valves 15. Each control valve 15 is associated with a respective hydraulic working appliance of the corresponding roof support unit. At least some of the valves 15 are provided with manually-actuable rocker arms 16, so that the associated hydraulic working appliances can be manually actuated. The distributor plate 10 is formed with internal ducts (not shown) for passing hydraulic fluid to, and from, the control valves 15. The distributor plate 10 is also provided with connections (not shown) for the hydraulic pressure and return lines (not shown) which pass along the longwall face and serve all the hydraulic control mechanisms. An actuator 17, for sequential control of an adjacent control unit/hydraulic control mechanism, is provided at one side of the distributor plate 10.

The electromagnetic valves 14, which constitute known automatic control means, operate on a 12 volt power supply. They are of an intrinsically safe design, and are encased to exclude dust and moisture. The electromagnetic valves 14 act as servo-valves to actuate the associated hydraulic control valves 15, which initiate the required operations of the associated hydraulic working appliances. The electromagnetic valves 14 are positioned on the top of the distributor plate 10, each valve being provided with a pedestal 18. The pedestals 18 establish hydraulic connections with the internal ducts in the distributor plate 10, and hence with the associated control valves 15. The electromagnetic valves 14 of each control unit can be arranged for automatically controlling the hydraulic working appliances of the associated roof support unit (individual automatic control), or for helping control the hydraulic working appliances of a group of roof support units (group automatic control). For group automatic control, the actuators 17 are used for passing control signals along the line of control units.

Figure 4:
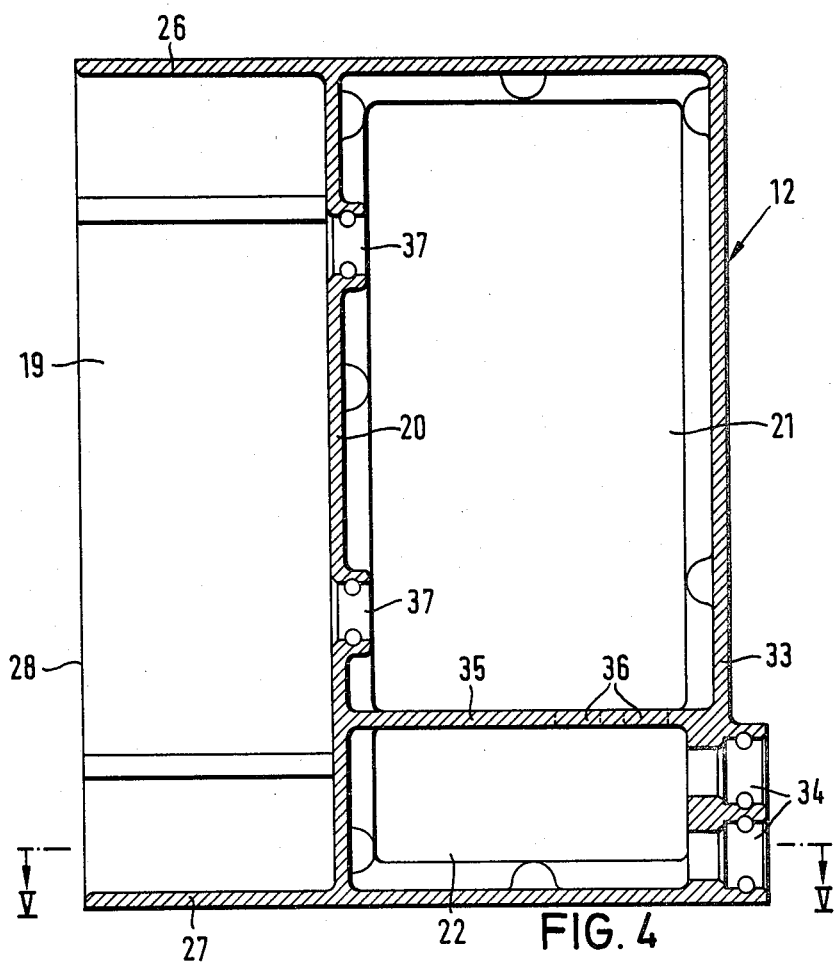
FIG. 4 is a transverse section taken through the protective casing of the control unit.

The protective casing 12 has a metal cast body, and is of substantially rectangular cross-section. The casing 12 has a main cuboidal chamber 19, which extends over its entire width. The chamber 19 is separated from two subsidiary cuboidal chambers 21 and 22 by means of a vertical partition 20. As best shown in FIGS. 3 to 5, the chamber 19 is open at the front. It is possible, therefore, to introduce the electronic control box 13, which is housed within a case 23, into the chamber 19 from the front, as indicated by the arrows shown in FIG. 3. The case 23 of the electronic control box 13 is externally shaped to conform with the internal shape of the chamber 19, so that the chamber 19 is substantially completely filled by the electronic control box. The case 23 is provided, on a pair of opposite, external vertical walls, with pairs of guide grooves 24 which slidingly engage complementary guide strips 25 provided on the corresponding pair of opposite, internal vertical walls 26 and 27 of the chamber 19. The electronic control box 13 can, therefore, be slid into place within the chamber 19 in the manner of a drawer. Alternatively, the guide strips 25 could be provided on the internal horizontal walls 28 and 29 of the chamber 19, in which case the guide grooves 24 would be positioned on the external horizontal walls of the case 23. In either case, it would be possible to reverse the positioning of the guide strips and grooves; namely to provide the guide strips 25 on the case 23 and to provide the guide grooves 24 within the chamber 19. The case 23 is so dimensioned that, when it has been pushed fully into the chamber 19, the front surface 30 is substantially co-planar with (or is slightly set back from) the front edges of the walls 26 to 29. The case 23 is secured within the chamber 19 by means of clamps (not shown) or other suitable fastening means.

The subsidiary chamber 21 houses the electromagnetic valves 14, and the subsidiary chamber 22 constitutes a lead-through chamber for leading the electric control cables (not shown) to the electromagnetic valves. As best seen in FIG. 4, the chamber 21 is larger than the chamber 22. In the regions of the chambers 21 and 22, the protective casing 12 is open at the bottom, the bases of the chambers 21 and 22 being defined by the distributor plate 10. In these regions, the protective casing 12 is also open at the top, the tops of the chambers 21 and 22 being defined by a cover plate 31 which is attached to the casing 12 by, for example, screw-threaded members 32.

The protective casing 12 has a rear wall 33. In the chamber 22, the rear wall 33 is formed with a plurality of apertures 34. Each of the apertures 34 is in the form of a generally cylindrical socket, and is adapted to mate with a plug pin (not shown) associated with one of the electric control cables (not shown) leading to the electromagnetic valves 14. The plug pins are attached to protective sleeves which surround the electric control cables. The plug pins can be tightly secured within the sockets 34 in such a manner as to resist tensile forces, and to seal the interior of the chamber 22 with respect to the external atmosphere. A vertical partition 35 is provided within the protective casing 12, the partition 35 separating the two chambers 21 and 22. Apertures 36 are provided in the partition 35, the apertures 36 enabling the electric control cables to pass from the lead-through chamber 22 to the valve chamber 21.

The partition 20 is also provided with a plurality of apertures 37, through which electric control cables (not shown) can pass from the electronic control box 13 to the electromagnetic valves 14. Here again, the apertures 37 are in the form of generally cylindrical sockets. Alternatively, the partition 20 could be provided with a plurality of plug pins in electrical connection with the electromagnetic valves 14, and the electronic control box 13 could be provided with matching sockets. In this case, electrical connection between the electronic control box 13 and the electromagnetic valves could be established by pushing the case 23 fully into the chamber 19. Thus, the electromagnetic valves 14 can be controlled either by the electronic control box 13, or via the electric control cables associated with the lead-through chamber 22.

The front face 30 of the case 23 of the electronic control box 13 is provided with an illuminated panel 38 (see FIG. 1). The panel 38 is associated with display means, such as light-emitting diodes, (not shown) for indicating the operating state of the control unit. A push-button selector switch 39 is also provided on the front face 30, the selector switch being operable to initiate different control operations such as sequential control, individual automatic control or group automatic control. A start button 40, an emergency cut-out switch 41 and an illuminated panel 42 are also provided on the front face 30. The panel 42 is used for indicating whether the electronic control box 13 is being actuated either indirectly from a central control stand (not shown) common to all the units associated with a group of roof support units or directly. If the electronic control box 13 is to be actuated directly, this is only possible if a "release signal" has previously been sent from the central control stand. In practice, the "release signal" will only be sent by the central control stand, if the selector switch 39 of the electronic control box has been set to the "individual automatic control" position. When the emergency cut-out switch 41 is actuated, the entire hydraulic system associated with the electronic control box 13 is brought to a stop.

We claim:

1. A control unit for an electro-hydraulic roof support control arrangement, the control unit having a protective casing (12) defining first and second chambers, the first chamber (21) accommodating a plurality of electromagnetic valves (14), and the second chamber (22) constituting a lead-through chamber for leading electric cables to the electromagnetic valves, the second chamber being provided with a respective aperture (34) for each of the electric cables, each of the apertures being adapted for connection to a complementary member attached to the associated electric cable, whereby the electric cables are connectible to the control unit so as to resist tensile forces, and in such a manner that the interior of the second chamber is sealed with respect to the external atmosphere, the protective casing further defining a third chamber (19), an electronic control box (13) disposed within the third chamber, the third chamber being open at one side of the protective casing, and the electronic control box being configured such that one surface thereof is substantially co-planar with the open side of the third chamber when the electronic control box is fully inserted into the third chamber.

2. A control unit according to claim 1, wherein the second chamber is smaller than the first chamber.

3. A control unit according to claim 1, wherein each of the chambers is cuboidal.

4. A control unit according to claim 1, wherein the electronic control box is insertable into, and removable from, the third chamber as a unit.

5. A control unit according to claim 1, wherein the electronic control box and the third chamber are provided with co-operable guide means, whereby the electronic control box can be introduced into, and removed from, the third chamber in the manner of a drawer.

6. A control unit according to claim 1, wherein the third chamber extends over the entire width of the protective casing, the first and second chambers being located to the rear of the third chamber and being separated therefrom by a partition (20) which extends over the entire width of the third chamber.

7. A control unit according to claim 6, wherein the partition is provided with apertures for the passage of electric leads from the electronic control box to the electromagnetic valves.

8. A control unit according to claim 7, wherein each of the apertures in the partition is a generally cylindrical socket.

9. A control unit according to claim 1, wherein the protective casing is a cast metal structure.

10. A control unit according to claim 1, wherein each of the apertures in the second chamber is constituted by a generally cylindrical socket, the generally cylindrical sockets being adapted to mate with plug pins attached to protective sleeves which accommodate electric cables.

11. A control unit/hydraulic control mechanism comprising a control unit, a distributor plate (10), and a valve block (11), the control unit having a protective casing (12) defining first and second chambers, the first chamber (21) accommodating a plurality of electromagnetic valves (14), and the second chamber (22) constituting a lead-through chamber for leading electric cables to the electromagnetic valves, the second chamber being provided with a respective aperture (34) for each of the electric cables, each of the apertures being adapted for connection to a complementary member attached to the associated electric cable, whereby the electric cables are connectible to the control unit so as to resist tensile forces, and in such a manner that the interior of the second chamber is sealed with respect to the external atmosphere, wherein the protective casing of the control unit is mounted on one side of the distributor plate, and the valve block is mounted on the other side of the distributor plate, the protective casing further defining a third chamber (19), an electronic control box (13) disposed within the third chamber, the third chamber being open at one side of the protective casing, and the electronic control box being configured such that one surface thereof is substantially co-planar with the open side of the third chamber when the electronic control box is fully inserted into the third chamber.

12. A control unit/hydraulic control mechanism according to claim 11, wherein the protective casing of the control unit is detachably connected to the distributor plate.

13. A control unit/hydraulic control mechanism according to claim 12, wherein the protective casing of the control unit is detachably connected to the distributor plate by means of screw-threaded members.

14. A control unit/hydraulic control mechanism according to claim 11, wherein the valve block comprises a plurality of hydraulic control valves.

15. A control unit/hydraulic control mechanism according to claim 14, wherein each of the hydraulic control valves is a piston-operated 4/3 way valve.

16. A control unit/hydraulic control mechanism according to claim 11, wherein one side of the first chamber is closed off by said one side of the distributor plate.

17. A control unit/hydraulic control mechanism according to claim 16, wherein the opposite side of the first chamber is closed off by a cover plate which is detachably connected to the protective casing of the control unit.

18. A control unit/hydraulic control mechanism according to claim 17, wherein one side of the second chamber is closed off by said one side of the distributor plate.

19. A control unit/hydraulic control mechanism according to claim 18, wherein the opposite side of the second chamber is closed off by said cover plate.

* * * * *